(12) United States Patent  (10) Patent No.: US 7,760,197 B2
Faase et al.  (45) Date of Patent: Jul. 20, 2010

(54) FABRY-PEROT INTERFEROMETRIC MEMS ELECTROMAGNETIC WAVE MODULATOR WITH ZERO-ELECTRIC FIELD

(75) Inventors: Kenneth J. Faase, Corvallis, OR (US); James McKinnell, Salam, OR (US); Arthur R. Piehl, Corvallis, OR (US); Murali Chaparala, Vancouver, WA (US); James R. Przybyla, Philomath, OR (US); Bao Yeh, Corvallis, OR (US); Adel Jilani, Corvallis, OR (US); Eric Nikkel, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1297 days.

(21) Appl. No.: 11/263,313

(22) Filed: Oct. 31, 2005

(65) Prior Publication Data

US 2007/0097694 A1    May 3, 2007

(51) Int. Cl.
*G06F 3/038* (2006.01)
*G02B 26/10* (2006.01)
(52) U.S. Cl. ...................... 345/204; 359/291
(58) Field of Classification Search ............. 359/192.2, 359/200.6, 217.1, 226.2; 345/211, 690, 204
See application file for complete search history.

(56) References Cited

U.S. PATENT DOCUMENTS

| | | | |
|---|---|---|---|
| 6,747,775 B2 | 6/2004 | Little | |
| 6,798,561 B2 * | 9/2004 | Huibers | 359/291 |
| 7,092,140 B2 * | 8/2006 | Pan et al. | 359/290 |
| 7,372,613 B2 * | 5/2008 | Chui et al. | 359/290 |
| 7,403,324 B2 * | 7/2008 | Huibers | 359/291 |
| 2003/0173499 A1 | 9/2003 | Cole et al. | |
| 2004/0111856 A1 | 6/2004 | Chang et al. | |
| 2004/0217919 A1 | 11/2004 | Piehl et al. | |
| 2004/0218251 A1 | 11/2004 | Piehl et al. | |
| 2005/0030545 A1 | 2/2005 | Tuschel et al. | |
| 2005/0094964 A1 | 5/2005 | Sato | |
| 2005/0111069 A1 | 5/2005 | Jilani et al. | |
| 2005/0122562 A1 | 6/2005 | Guo et al. | |
| 2005/0134962 A1 | 6/2005 | Verghese | |

FOREIGN PATENT DOCUMENTS

WO    WO 02/086582 A    10/2002

OTHER PUBLICATIONS

Little, M.J. "Compliant MEMS and their use in optical components", Optical Fiber Communication Conference and Exhibit, Washington DC.

* cited by examiner

*Primary Examiner*—Duc Q Dinh

(57) ABSTRACT

Systems, methodologies, and other embodiments associated with a micro-electrical-mechanical system (MEMS) Fabry-Perot interferometric device (FPID) are described. Fabricating a MEMS FPID may include fabricating a pixel plate and a reflector plate so a Fabry-Perot cavity is defined therebetween. Fabrication may include producing a capacitor plate that facilitates electrostatically moving the pixel plate. Fabrication may include producing electrical connections between plates and producing circuitry to control plate voltages to facilitate creating an electrostatic force between plates. The MEMS FPID may include stops fabricated from a conductive material and circuitry for maintaining the stops and plates at an electrical potential that will yield a zero electric field contact event.

18 Claims, 11 Drawing Sheets

Prior Art Figure 1

FABRY-PEROT INTERFEROMETRIC MEMS ELECTROMAGNETIC WAVE MODULATOR WITH ZERO-ELECTRIC FIELD

BACKGROUND

A Fabry-Perot interferometric device (FPID) can be configured to transmit electromagnetic waves (e.g., light) of a predetermined wavelength. Generally, FPIDs include an optical cavity—often referred to as a Fabry-Perot cavity—that is formed between two reflectors (e.g., mirrors) in the FPID. Some FPIDs are configured so that the gap between the two reflectors can be altered by moving either or both of the mirrors using, for example, a micro-electrical-mechanical system (MEMS). Varying the gap facilitates precisely tuning an FPID to a particular wavelength. Since visible light colors are distinguished by wavelength, a tunable FPID may therefore be controllably configured to transmit different colors of visible light. Additionally, a tunable FPID may be configured to not transmit light. Therefore, a tunable FPID may operate, for example, as a red/green/blue/black (RGBB) device.

Referring to Prior Art FIG. 1, an FPID 100 includes two parallel members 110 and 120 positioned a distance $d_1$ apart in an orientation that creates an FP cavity. Reflective layers on members 110 and 120 make these members operate as reflectors. When an incident light enters FPID 100 at an angle $\alpha$, a stationary standing wave pattern is produced between parallel members 110 and 120. When the FP cavity has a width that is an integral number of half wavelengths, light beams having a specific wavelength with a resonant range are output.

To select desired wavelengths for output (e.g., red, green, blue), an FPID may have stops that facilitate controlling the locations to which a moveable member (e.g., 120) may be moved. These stops may facilitate precisely controlling the location of the moveable member and thus may facilitate precisely controlling the width of the optical gap. However, conventional FPIDs may experience stiction problems due to charge trapping that occurs at or near stops.

The FP cavity in FPID 100 may initially be set to a first desired wavelength $\lambda_1$ by orienting members 110 and 120 parallel to each other at a distance $d_1$. The FP cavity in FPID 100 may then be set to a second desired wavelength $\lambda_4$ by orienting members 110 and 120 parallel to each other at a distance $d_4$. Distance $d_1$ and distance $d_4$ may be associated with stops. Additionally, members 110 and 120 may be positioned at locations between stops associated with $d_1$ and $d_4$ to form a gap having widths corresponding to $d_2$ and $d_3$. Some example FP cavity gap sizes may include:

| Gap Size | Color |
|---|---|
| 1000 Å | Black |
| 2000 Å | Blue1 |
| 2500 Å | Green1 |
| 3000 Å | Red1 |
| 3800 Å | Blue2 |
| 4800 Å | Green2 |

In some FPIDs, the moveable member may be repositioned using an electrostatic actuator. However, as the moveable member is repositioned, an electric field may build at and/or near the stops and/or at and/or near different components that may come in contact with each other. This electric field may lead to charge trapping. Additionally, if various FPID components come in contact, they may short out. Clearly this is undesirable. Thus, to prevent shorting, stops may be fabricated from a dielectric material. While fabricating stops from a dielectric material may reduce shorting, this fabrication technique may increase charge trapping. Increased charge trapping may have negative consequences that include actuation signal screening and stiction.

In some devices that include multiple FPIDs, CMOS circuitry is provided on a substrate in an array corresponding to the placement desired for the multiple FPIDs. A structure(s) may then be fabricated above the CMOS circuitry. The structure(s) may include, for example, a fixed top plate, a moveable middle plate, and a fixed bottom capacitor plate. The moveable middle plate may be a reflective pixel plate that is supported by flexures attached to the substrate. The structures and circuitry include opposite plates of a capacitor. Applying a charge or voltage between the opposite plates facilitates attracting and/or repelling the middle plate by electrostatic forces. In the micron and submicron sizes associated with MEMS FPIDs, voltages of a few volts compatible with CMOS circuitry can create a suitable displacement (e.g., 500 Å). The positions to which the middle plate may be moved can be controlled by stops.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

Prior Art

DETAILED DESCRIPTION

Figure 1:
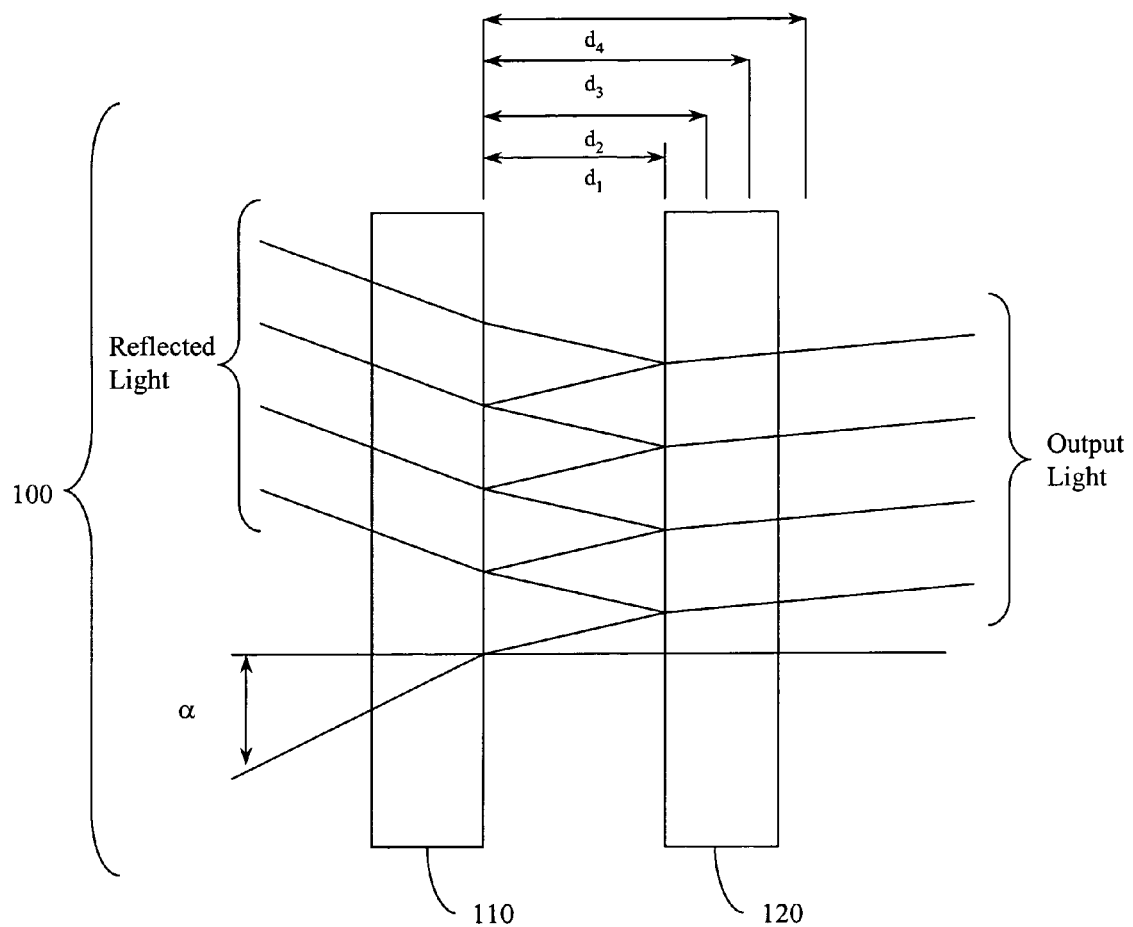
FIG. 1 illustrates an example FPID.

Example systems and methods described herein relate to reducing stiction in an FPID by using a conductive stop(s) and creating conditions where contacts between various FPID components produce a zero electric field contact event. Fabricating the stop(s) from a conductor rather than a dielectric and maintaining the stop(s) and the point(s) of contact for the stop(s) at the same electric potential mitigates creating a charge trapping electric field, which in turn mitigates stiction related to charge trapping. In one example, maintaining the stop(s) and the point(s) of contact for the stops at the same electric potential is achieved by electrically shorting these elements together.

Thus, example systems and methods described herein facilitate reducing and/or eliminating stiction associated with dielectric charge trapping in FPIDs. Constructing a stop from a conductor, and maintaining the stop and the point of contact for the stop at the same electrical potential may also facilitate controlling the location of an electric field in an FPID. The electric field can be controlled to remain at desired locations between capacitor plates of the FPID rather than building at and/or near the stop(s). Additionally, strategically locating trenches through the plates further facilitates controlling the location of a potentially charge trapping electric field. With the trenches, the electric field can be controlled to remain across a trench separating the stops from other portion(s) of the plate(s).

Recently, different types of MEMS devices, including micro-actuator devices and micromotor devices have been developed. In some cases, hundreds of thousands of micro devices may be arranged together and used, for example, in optical applications. In one case, 500,000 FPIDs can be arranged together in an array. Thus, some example systems and methods include a driven array of MEMS FPIDs that are useful in an SLM (spatial light modulator) for forming optical images. Furthermore, some devices (e.g., SLM, projector) may have multiple dies.

The following includes definitions of selected terms employed herein. The definitions include various examples and/or forms of components that fall within the scope of a term and that may be used for implementation. The examples are not intended to be limiting. Both singular and plural forms of terms may be within the definitions.

CMOS, as used herein, refers to a complementary metal oxide semiconductor.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be considered to be operably connected if they are able to communicate signals to each other directly or through one or more intermediate entities like a processor, an operating system, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Stiction", as employed herein refers to an adhesive force. Stiction may occur when one surface undesirably adheres to another surface. The adhesion may result from attractive intermolecular forces (e.g., Van der Waals forces) between the two surfaces.

Figure 2:
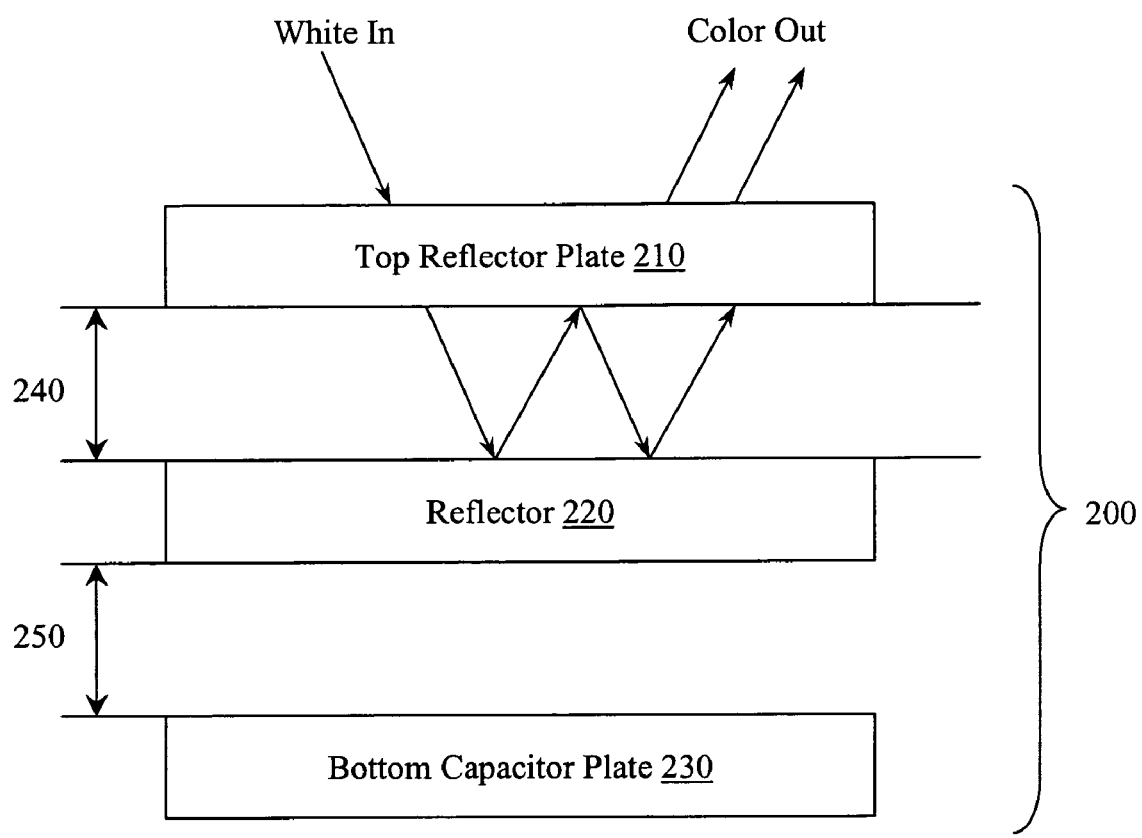
FIG. 2 illustrates an example FPID.

Referring now to FIG. 2, an electrostatically operated tunable FPID 200 with dark state capability is illustrated. FPID 200 employs three layers for its optical and electrostatic operation. A top reflector plate 210 may be fabricated from a partially transparent reflective material. The top reflector plate 210 may be fabricated from a conductive (e.g., metallic) material. It is to be appreciated that additional supportive elements (e.g., upper substrate, bottom substrate, flexures) are absent from FIG. 2. The top reflector plate 210 may be held in a fixed position and/or may be fixed in position. Top reflector plate 210 may also be electrically connected to a voltage source(s). Creating different voltages in this layer and another layer(s) may produce an electrostatic force between the layers that may facilitate moving a layer with respect to top reflector plate 210.

A reflector 220 may be fabricated from a highly reflective conductive (e.g., metallic material). Reflector 220 may be electrically connected to circuitry (e.g., CMOS transistors) to facilitate creating different voltages in reflector 220. Creating different voltages in reflector 220 and top reflector plate 210 may produce an electrostatic force between top reflector plate 210 and reflector 220. Thus, reflector 220 may be movable with respect to top reflector plate 210 and therefore an FP gap 240 between top reflector plate 210 and reflector 220 may be controlled to have different sizes. The locations to which reflector 220 may be moved may be controlled, at least in part, by the presence of one or more stops made from a conductive material. Fabricating a stop(s) from a conductive material and maintaining the stop(s) at a voltage that leads to a zero electric field existing between a stop(s) and a component(s) it contacts reduces charge trapping and thus prevents stiction.

FPID 200 may also include a bottom capacitor plate 230. Bottom capacitor plate 230 may be fabricated from a conductive (e.g., metallic) material. Capacitor plate 230 may be held in place and/or may be fixed in place. Plate 230 is typically connected to an electrical fixed potential. Creating different voltages in capacitor plate 230, reflector 220 and/or top reflector plate 210 facilitates repositioning reflector 220. An FPID may be configured with a set of stops that facilitate controlling the FP cavity size by controlling the positions to which the reflector 220 can be moved. These stops may be fabricated from a conductive (e.g., metallic) material. A first stop may control the gap size 240 between the top reflector plate 210 and the reflector 220. Similarly, a second stop may control the gap size 250 between the bottom capacitor plate 230 and reflector 220.

FPID 200 may be configured in two different electrostatic modes. In a dual capacitor configuration, bottom capacitor plate 230 is held at a fixed potential, reflector 220 is connected to CMOS circuitry configured to produce different voltages in reflector 220, and top reflector plate 210 is connected to a power supply providing a constant voltage different than the fixed potential on plate 230. Thus, an electrostatic force may be created between top reflector plate 210 and reflector 220 and/or between reflector 220 and bottom capacitor plate 230.

In a dual gap configuration, bottom capacitor plate 230 is held at a fixed potential, reflector 220 is connected to CMOS circuitry configured to facilitate producing different voltages in reflector 220, and top reflector plate 210 is shorted to reflector 220. In a second dual gap mode, top reflector plate 210 and reflector 220 is held at the same fixed potential, and the bottom capacitor plate 230 is connected to CMOS circuitry configured to facilitate producing different voltages in bottom capacitor plate 230. In either dual gap configuration, an electrostatic force may be created only between the reflector 220 and the bottom capacitor plate 230.

Figure 3:
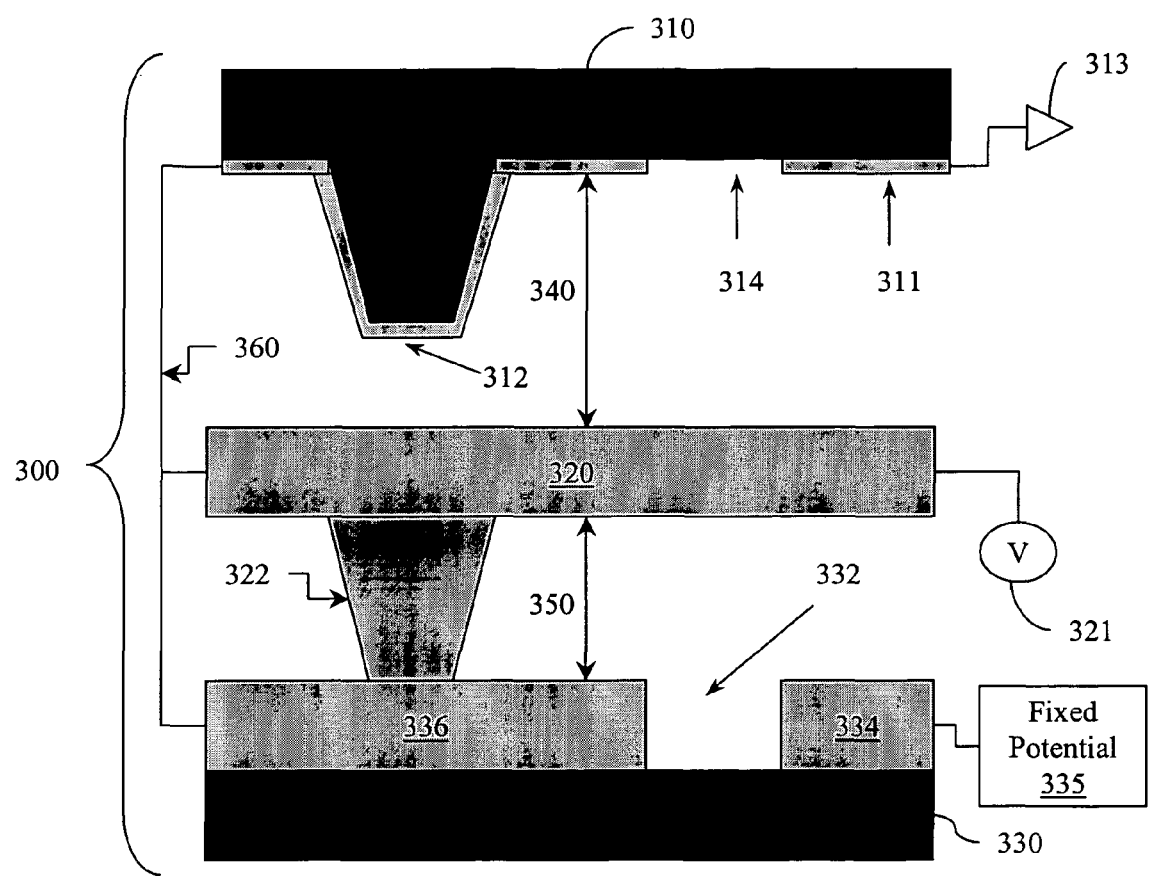
FIG. 3 illustrates an example dual capacitor FPID.

FIG. 3 illustrates an FPID 300 arranged in a dual capacitor configuration. The reflector 320 can be pulled towards upper substrate 310. Upper substrate 310 may be connected to a top reflector 311. Upper substrate 310 may be fabricated from a dielectric while top reflector 311 may be fabricated from a conductive (e.g., metallic) material. The reflector 320 may contact stop 312. Similarly, reflector 320 can be pulled towards bottom substrate 330. Bottom substrate 330 may be connected to portions of a bottom capacitor (e.g., 334, 336). Bottom substrate 330 may be fabricated from a dielectric material while portions 334 and/or 336 may be fabricated from a conductive (e.g., metallic) material. In this case stop 322 may contact bottom outer stop 336. These stops may either be connected individually or in the form of an outer ring. In either case, since the stops 312 and 322 and the points with which they come in contact are maintained at the same electrical potential by shorting them together, these contacts will be zero field contact events. Thus, "zero field contact event" refers to an occurrence where two elements having the same electrical potential come in contact. These zero field events will not lead to charge trapping and thus will not lead to stiction associated with electric fields. Other types of stiction (e.g., Vanderwaals) may still exist.

In one example, top substrate 310 and bottom substrate 330 are fabricated from a dielectric material. In the example, stop 312, reflector 320, top reflector 311, bottom capacitor 334, and stop 322 may be fabricated from a conductive (e.g., metallic) material. Additionally, top reflector 311 may be electrically isolated from stop 312 by trench 314. In one example, trench 314 is configured to the smallest size that electrically isolates top reflector 311 from stop 312. Top reflector 311 may be employed in creating an electrostatic force between reflector 320 and other plates. Thus, top reflector 311 may need to be electrically isolated from stop 312 which may come in contact with the other plate(s) involved in creating the electrostatic force.

Bottom substrate 330 may also support metallic portions 334 and 336 that are electrically isolated by trench 332. Portion 334 may be, for example, a bottom electrode while portion 336 may be an outer ring. Portion 334 may be employed in creating an electrostatic force between capacitor plate 330 and other plates. Thus, portion 334 may need to be electrically isolated from portion 336 which may come in contact with a stop attached to another plate involved in creating the electrostatic force and/or moved by electrostatic force.

Figure 4:
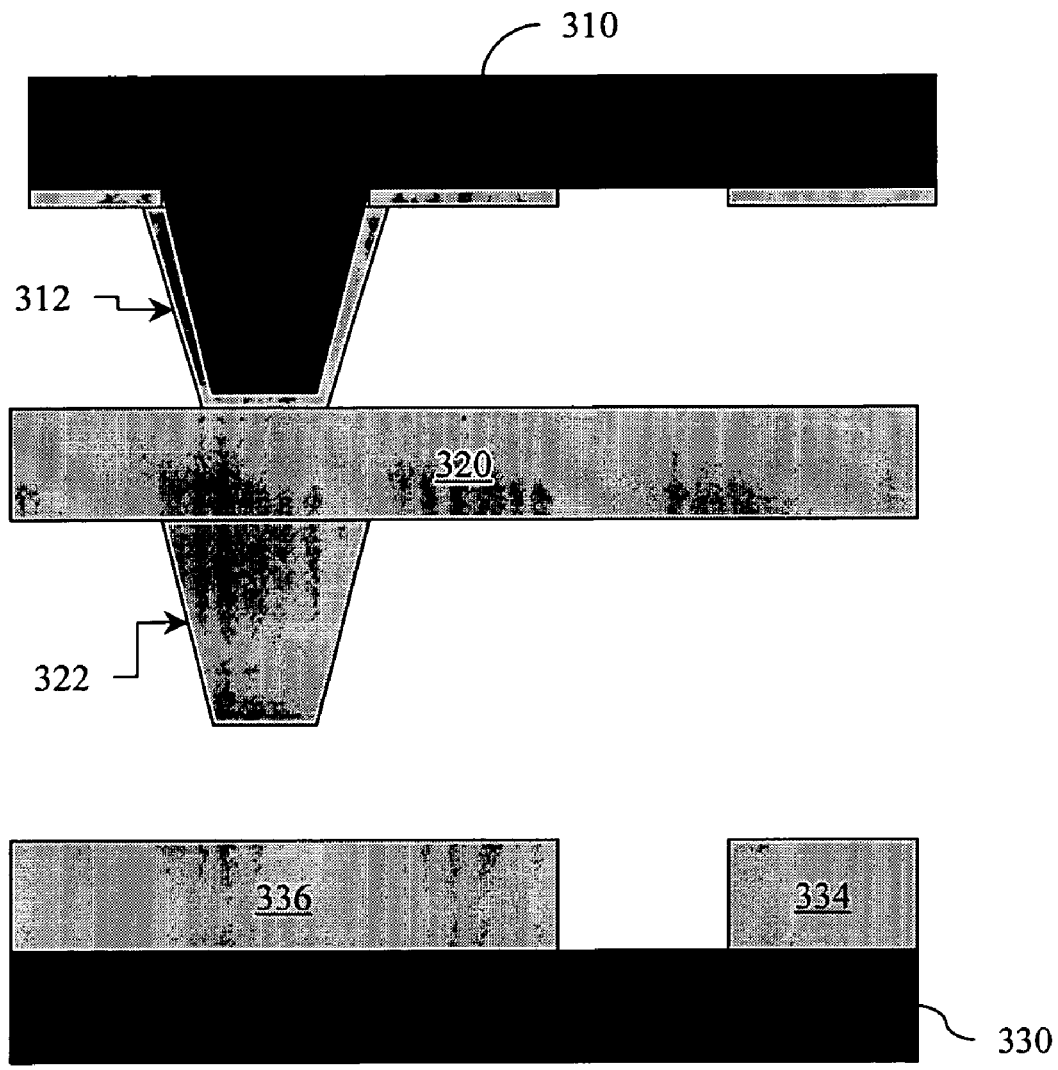
FIG. 4 illustrates an example FPID in an "up-stop" position.

Bottom capacitor 334 may be electrically connected to a fixed potential 335. Top reflector 311 may be electrically connected to a constant voltage source 313 and reflector 320 may be connected to a variable voltage source 321. Thus, an electrostatic potential can be created between top reflector 311 and reflector 320 and/or between reflector 320 and bottom capacitor 334. This electrostatic potential facilitates moving reflector 320 to locations that include an "up-stop" position (illustrated in FIG. 4), a "down-stop" position illustrated in FIG. 3, and various positions between the up-stop position and the down-stop position (e.g., FIG. 10).

Stop 312, reflector 320, and portion 336 are shorted together by circuit 360. Thus, when reflector 320 is moved to either the up-stop position or down-stop position, contact between reflector 320 and stop 312 or between stop 322 and portion 336 will be a zero field contact event. Additionally, an electric field that may otherwise have been present at or near stop 322 can be controlled to be located at or near trench 332 on bottom capacitor plate 330. Similarly, an electric field that may otherwise have been present at or near stop 312 can be controlled to be located at or near trench 314 in top reflector 311. Controlling the location of these fields reduces charge trapping at or near stop 312 and/or stop 322.

Figure 5:
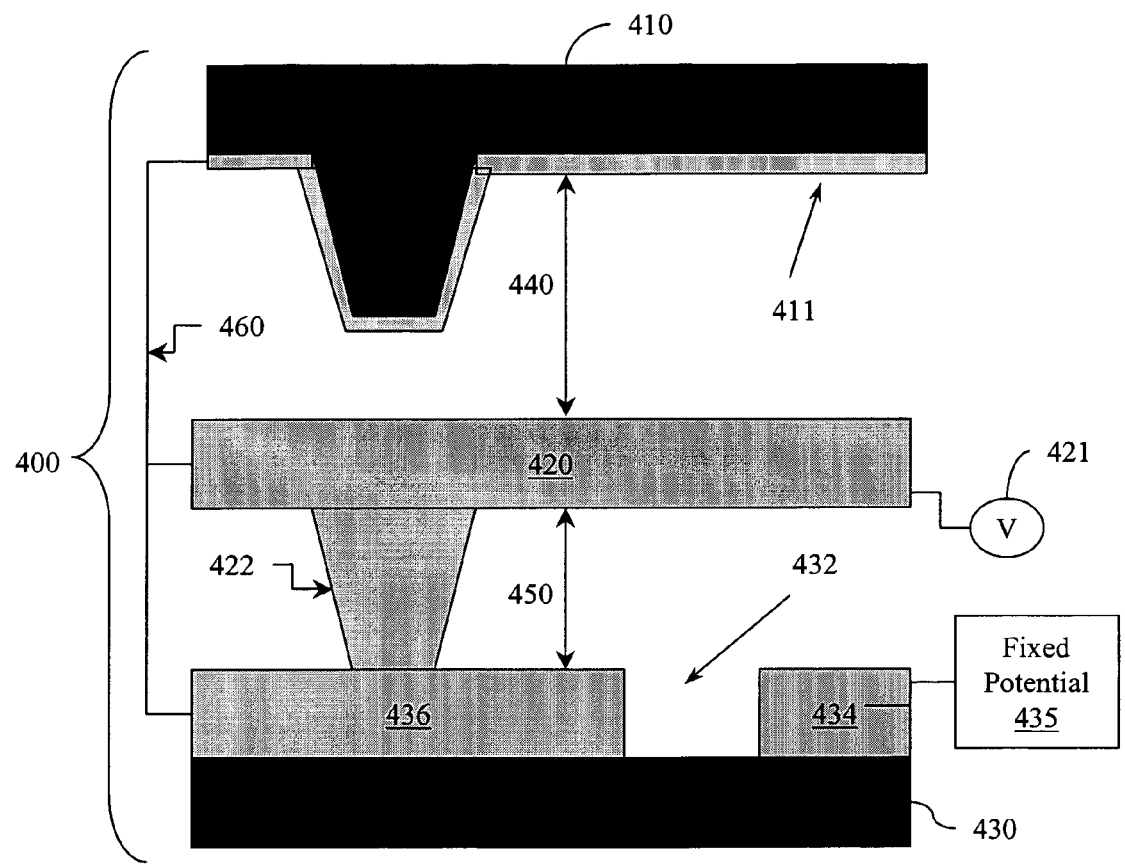
FIG. 5 illustrates an example dual gap FPID.
Figure 6:
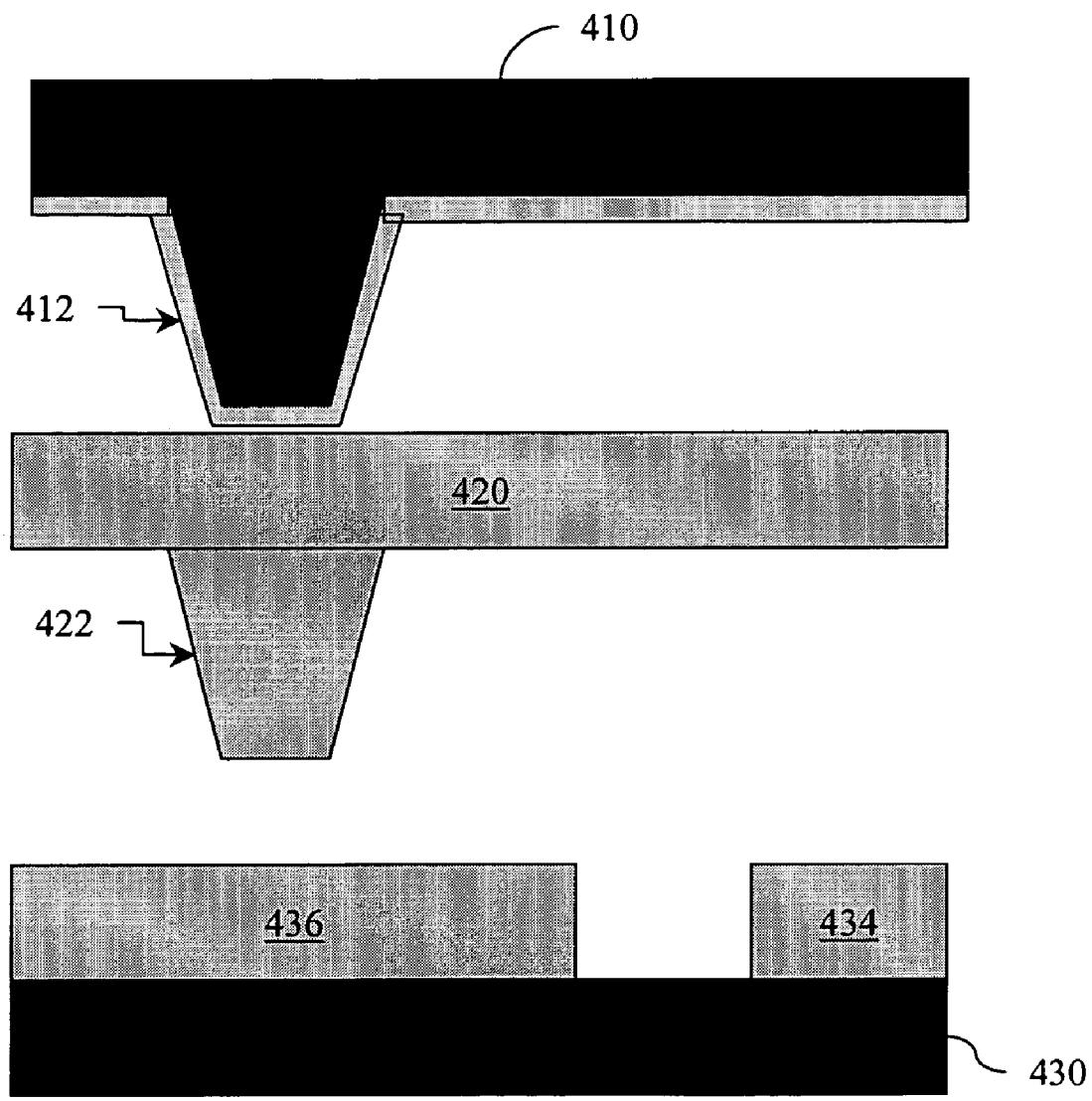
FIG. 6 illustrates an example FPID in an "up-stop" position.

FIG. 5 illustrates an FPID 400 arranged in a dual gap configuration. In the dual gap configuration, contact between top reflector 411 (a.k.a. partial reflector) and reflector 420 (a.k.a. pixel plate) will be a zero field contact event since stop 412 and reflector 420 are shorted together by circuit 460.

The reflector 420 can be pulled down towards a bottom electrode 434 located on the bottom substrate 430. Stop 422 will contact bottom plate stops 436 preventing contact between reflector 420 and bottom center electrode 434. The stops 436 on the bottom substrate 430 are held at the same electrical potential as reflector 420 and its stops (e.g., 422) by short circuit 460. Thus, contact between these elements will be a zero field event.

An electric field that may otherwise have been present at or near stop 422 can be controlled to be located at or near trench 432 on bottom substrate 430.

In one example, top substrate 410 and bottom substrate 430 are fabricated from a dielectric material. In the example, reflector 420, top reflector 411, bottom capacitor 434, and stop 422 may be fabricated from a conductive (e.g., metallic) material.

Bottom substrate 430 may support conductive (e.g., metallic) portions 434 and 436 that are electrically isolated by trench 432. Bottom capacitor 434 may be electrically connected to fixed potential 435. Top reflector 411 may be electrically shorted to reflector 420 and reflector 420 may be connected to a variable voltage source 421. Thus, an electrostatic potential can be created between top reflector 411 and reflector 420 and/or between reflector 420 and bottom capacitor 434. This electrostatic potential facilitates moving reflector 420 to a "down-stop" position illustrated in FIG. 5, and various positions between the up-stop position and the down-stop position (e.g., FIG. 10). "Up-stop" positions may be achieved with other forces (e.g., mechanical forces) provided by other components (e.g., flexures).

Top reflector 411, reflector 420, and portion 436 are shorted together by circuit 460. Thus, when reflector 420 is moved to either the up-stop position or down-stop position, contact between top reflector 411 and reflector 420 or between stop 422 and portion 436 will be a zero field contact event. An electric field that may otherwise have been present at or near stop 422 can be controlled to be located at or near trench 432 on bottom substrate 430.

A spatial light modulator (SLM) is a device that modulates incident light in a spatial pattern to form an image. The image may correspond to an electrical and/or optical input received by the SLM. The incident light may be modulated in various ways. For example, the light may be modulated with respect to phase, intensity, polarization, direction, and so on.

SLMs are employed in applications including projection displays, video monitors, graphics monitors, televisions, and so on. An SLM may include individually addressable picture elements that correspond to pixels in an image data frame. A stream of image data may be input to an SLM and then each individual picture element may be driven according to a corresponding pixel in the image data frame. The image data may then be displayed on the SLM one frame at a time.

A set of MEMS FPIDs may be arranged together in SLM devices. Thus, in one example, the MEMS FPIDs may be formed in an array on a substrate that is incorporated into a display apparatus. Similarly, in another example, MEMS FPIDs may be incorporated into a projector that includes a light source configured to provide a white light and a set of MEMS FPIDs that are configured to transmit a set of selected electromagnetic waves by optical interference. The projector may also include a projection lens unit for magnifying and transmitting the set of selected electromagnetic waves output from the MEMS FPIDs so that the set of selected electromagnetic waves travel toward a selected target.

Example methods may be better appreciated with reference to flow diagrams. While for purposes of simplicity of explanation, the illustrated methods are shown and described as a series of blocks, it is to be appreciated that the methods are not limited by the order of the blocks, as some blocks may occur in different orders and/or concurrently with other blocks from that shown and described. Moreover, less than all the illustrated blocks may be required to implement an example method. Blocks may be combined or separated into multiple components. Furthermore, additional and/or alternative methods can employ additional, not illustrated blocks. While the figures illustrate various actions occurring in serial, it is to be appreciated that in different examples, various actions could occur concurrently, substantially in parallel, and/or at substantially different points in time.

Figure 7:
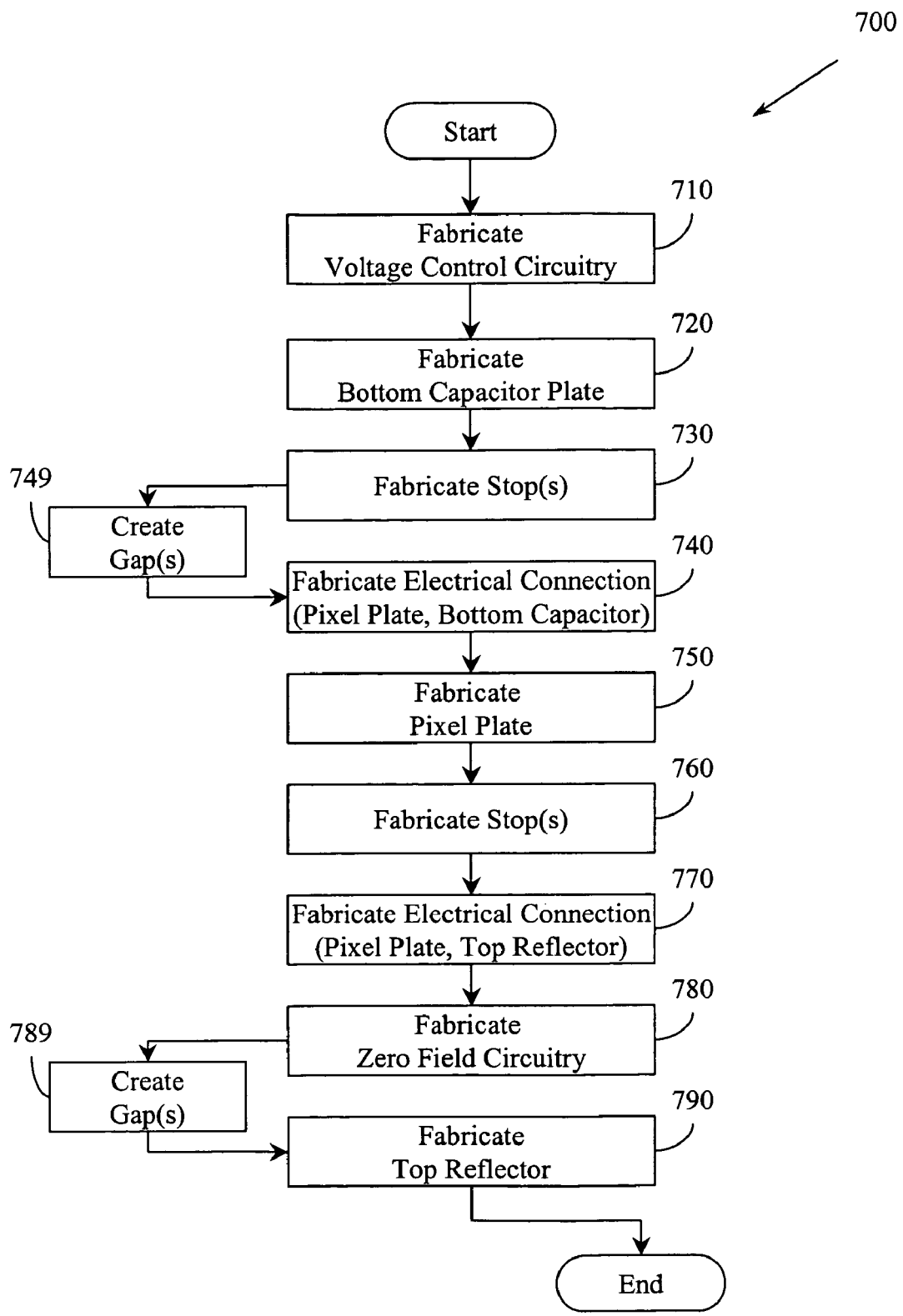
FIG. 7 illustrates an example method for fabricating an FPID having one or more conductive stops.

FIG. 7 illustrates an example method 700 associated with fabricating a MEMS FPID. The illustrated elements denote "processing blocks" that may be implemented in logic. In one example, the processing blocks may represent executable instructions that cause a computer, processor, fabrication device, and/or logic device to respond, to perform an action (s), to change states, and/or to make decisions. In another example, the processing blocks may represent control information suitable for controlling a fabrication device.

FIG. 7 illustrates a method 700 for fabricating a MEMS FPID having one or more conductive stops. As described above, one example MEMS FPID may have a top reflector plate, a pixel plate, and a bottom capacitor plate. Method 700 may include, at 710, fabricating circuitry to control a voltage in one or more elements of an FPID. For example, the circuitry may control voltage in a top reflector plate, a pixel plate, and/or a bottom capacitor plate. In one example, the voltage control circuitry will only control a selectable voltage supplied to a pixel plate. Selectively applying different voltages to two or more of the top reflector plate, the pixel plate, and the bottom capacitor plate can create an electrostatic force between the two plates to which the different voltages are applied. In one example, this circuitry fabricated at 710 may facilitate holding a bottom capacitor plate at a fixed potential.

Method 700 may also include, at 720, fabricating the bottom capacitor plate in a position and orientation with respect to a later fabricated pixel plate that facilitates electrostatically moving the pixel plate. The bottom capacitor plate may include trenches and/or stops. Thus, method 700 may also include, at 730, selectively fabricating a stop(s) from a conductive material. In different examples the stops fabricated at 730 may appear on the bottom capacitor plate and/or on the pixel plate. Trenches in the bottom capacitor plate may facilitate electrically isolating portions of the capacitor plate from a stop.

Method 700 may also include, at 740, fabricating an electrical connection between the pixel plate and the bottom capacitor plate. This connection may facilitate maintaining electrical potentials between these plates and/or stops so that contact between the plates and/or stops will be zero field events. In one example, this connection may be a short circuit.

Method 700 may also include, at 750, fabricating the pixel plate on a flexure supported platform. Being fabricated into a flexure supported platform allows electrostatic forces to move the pixel plate. The positions to which the pixel plate can be moved can be controlled, at least in the up-stop position and the down-stop position, by stops fabricated into the pixel plate, the bottom capacitor, and/or the top reflector. Thus, method 700 may include, at 760, selectively fabricating stops from a conductive material.

Method 700 may also include, at 770, fabricating an electrical connection between the top reflector plate and the pixel plate. This electrical connection facilitates maintaining the top reflector plate, the pixel plate, and/or stops at an electrical potential that will yield a zero electric field contact event when these components touch. The electrical connection may be, for example, a short circuit.

Method 700 may also include, at 780, fabricating circuitry to facilitate maintaining stops and/or plates at an electrical potential such that contact between stops and plates will result in a zero field contact event. This circuitry may be, for example, an electrical short circuit. Method 700 may also include, at 790, fabricating the top reflector plate in a position and orientation with respect to the pixel plate so that a Fabry-Perot cavity may be defined therebetween. The top reflector plate may include stops. When the top reflector plate includes a stop it may also include a trench that facilitates electrically isolating the stop from another portion(s) of the top reflector that is employed to create electrostatic forces between plates. While 720, 750, and 790 describe fabricating the bottom capacitor plate, the pixel plate, and the top reflector plate, it is to be appreciated that method 700 may also include creating gaps between these plates. For example, between 720 and 750 a gap between the bottom capacitor plate and the pixel plate may be created. Similarly, between 750 and 790 a gap between the pixel plate and the top reflector may be created. Thus, method 700 may also include, at 749 and 789, creating a gap(s).

An FPID fabricated according to method 700 may have different configurations that depend on electrical connections. Thus, in one example, method 700 may include fabricating the electrical connection between the top reflector plate and the pixel plate and fabricating the electrical connection between the pixel plate and the bottom capacitor plate to define a dual capacitor configuration. In another example, method 700 may include fabricating the electrical connection between the top reflector plate and the pixel plate and fabricating the electrical connection between the pixel plate and the bottom capacitor plate to define a dual capacitor configuration.

As described above, multiple FPIDs may be employed in various devices (e.g., SLM, projector). Thus, method 700 may be repeated to facilitate fabricating a plurality of the MEMS FPIDs into an array of individually addressable MEMS FPIDs.

Figure 8:
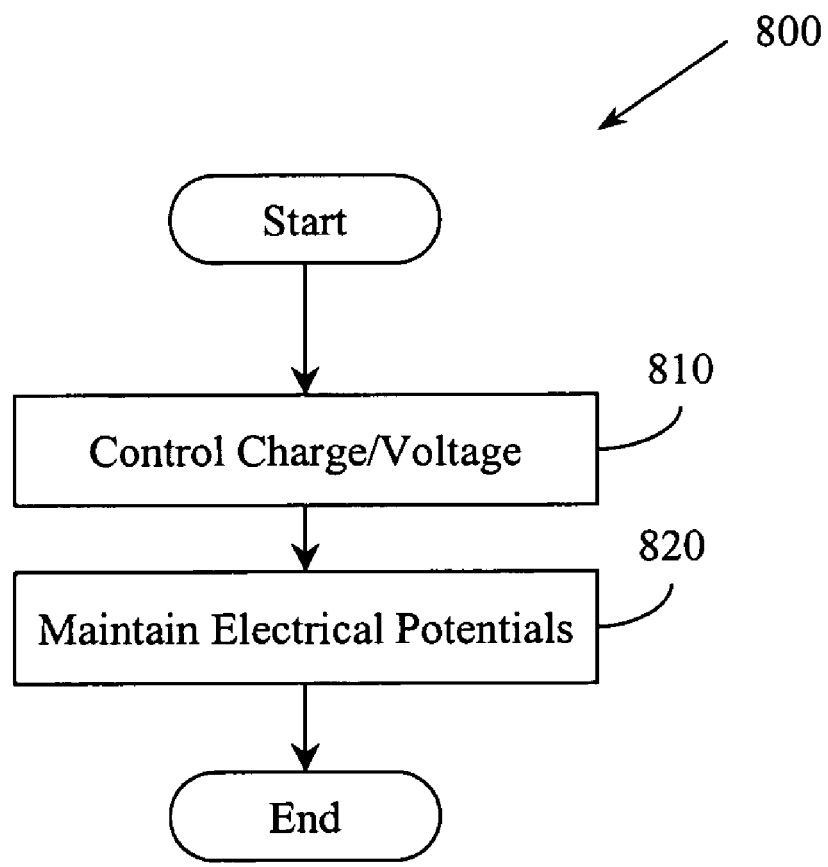
FIG. 8 illustrates an example method for using an FPID having one or more conductive stops.

FIG. 8 illustrates a method 800 for using an FPID having one or more conductive stops. Method 800 may include, at 810, for a pixel of a pixilated displayable image, controlling a predetermined amount of charge over a Fabry-Perot (FP) cavities. Alternatively, and/or additionally, method 800 may include at 810 controlling a predetermined voltage in one or more plates in an FPID. In both cases, controlling the charge or voltage facilitates selecting a visible wavelength at an intensity by optical interference to display the pixel by controlling the width of the FPID cavity.

In the FPID device, the FP cavity is defined between a top reflector and a pixel plate. When the top reflector includes a stop fabricated from a conductive material, the top reflector will include a gap (e.g., trench) that facilitates electrically isolating the stop from another portion of the top reflector employed in creating an electrostatic force. This facilitates using a stop made from a conductive material, where the stop may come in contact with another plate involved in creating the electrostatic force.

Method 800 may also include, at 820, maintaining the top reflector, the pixel plate, and a stop(s) at an electrical potential so that contact between one or more of the top reflector, the pixel plate, and a stop(s) will be a zero electric field contact event. Since FPIDs may be fabricated into devices like SLMs and projectors, method 800 may also include, (not illustrated), providing light for illuminating the visible wavelength and dividing a displayable image into the pixilated displayable image.

In one example, controlling the predetermined amount of charge over one or more FP cavities may include three separate activities performed in three different FPIDs. For example, controlling the predetermined amount of charge may include, for a red color wavelength, controlling the predetermined amount of charge over a first FP cavity to select a red intensity corresponding to a red color component for the pixel, for a green color wavelength, controlling the predetermined amount of charge over a second FP cavity to select a green intensity corresponding to a green color component for the pixel, and for a blue color wavelength, controlling the predetermined amount of charge over a third FP cavity to select a blue intensity corresponding to a blue color component for the pixel.

Figure 9:
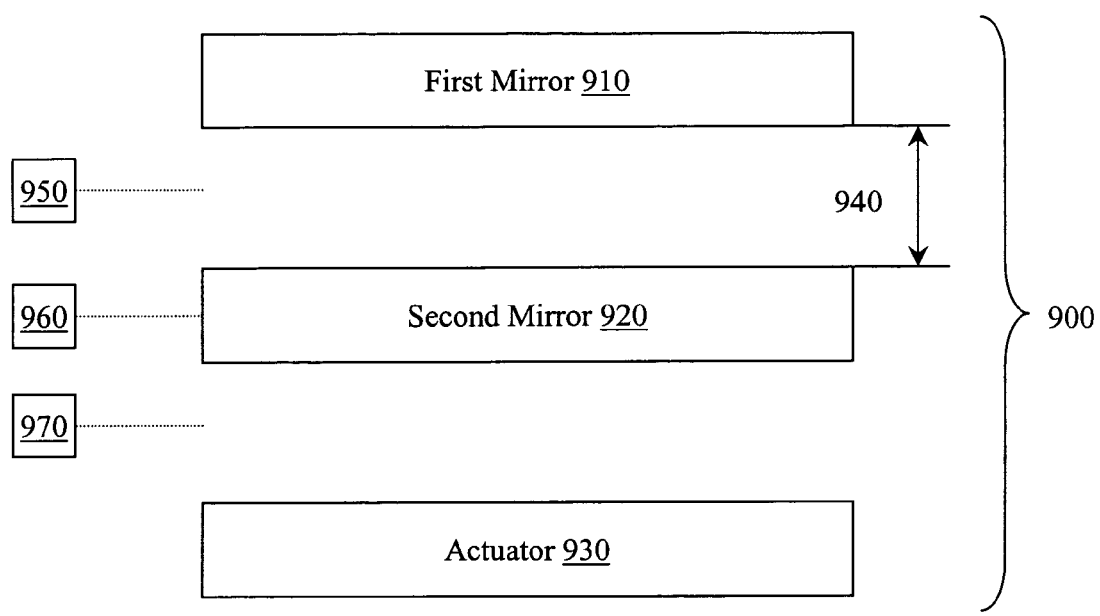
FIG. 9 illustrates an example MEMS FPID.

FIG. 9 illustrates a MEMS FPID 900. The FPID 900 includes a first mirror 910, a second mirror 920 oriented and positioned with respect to the first mirror 910 to define an FP cavity therebetween and a MEMS actuator 930 configured to vary the FP cavity width 940 by moving the second mirror 920 to contact a stop(s) made of a conductive material. To reduce stiction, the stop(s) may be maintained at an electrical potential that results in a zero electric field contact event when the second mirror 920 contacts the stop(s). The FPID may be arranged in different configurations including, for example, a dual capacitor configuration and a dual gap configuration. Once again, in FIG. 9 various supporting elements (e.g., top substrate, bottom substrate, flexures) are omitted for clarity.

In a pure "move to contact" FPID, FPID 900 would only have two states, a color state and a black state. However, in a hybrid "float and move to contact" FPID, FPID 900 could have two or more states. In a pure move to contact FPID, second mirror 920 could only take positions indicated by markers 950 and 970. Stops on first mirror 910, second mirror 920, and/or actuator 930 would define these two positions. However, in a hybrid float and move to contact FPID, second mirror 920 could take other positions. For example, second mirror 920 could take positions indicated by markers 950, 960, and 970. While positions 950 and 970 would be defined by stops, position 960 would be a floating position. While three positions are illustrated, it is to be appreciated that FPIDs that include stops fabricated from conductive materials may have two or more states.

Figure 10:
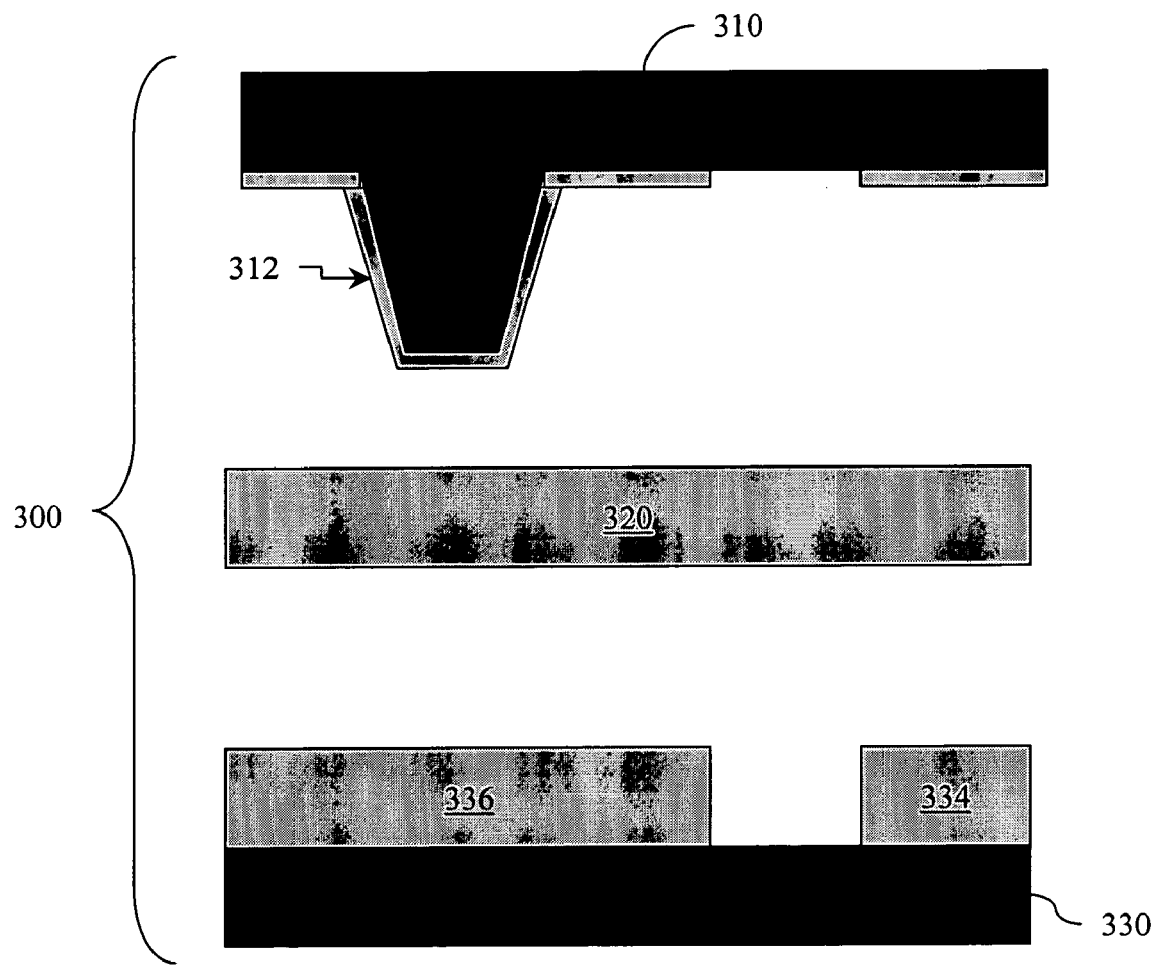
FIG. 10 illustrates an example FPID.

FIG. 10 illustrates another example of FPID 300 with some of its circuitry removed. In this example, there is only one stop, stop 312. While a single stop 312 is illustrated, it is to be appreciated that in different examples top substrate 310 may be configured with more than one stop 312. For example, configuring top substrate 310 with multiple (e.g., four) stops 312 arranged in a geometric pattern may facilitate improving operating characteristics like stability with respect to reflector 320 contacting the stops 312. Reflector 320 is illustrated in a position that is neither an up-stop position nor a down-stop position.

Figure 11:
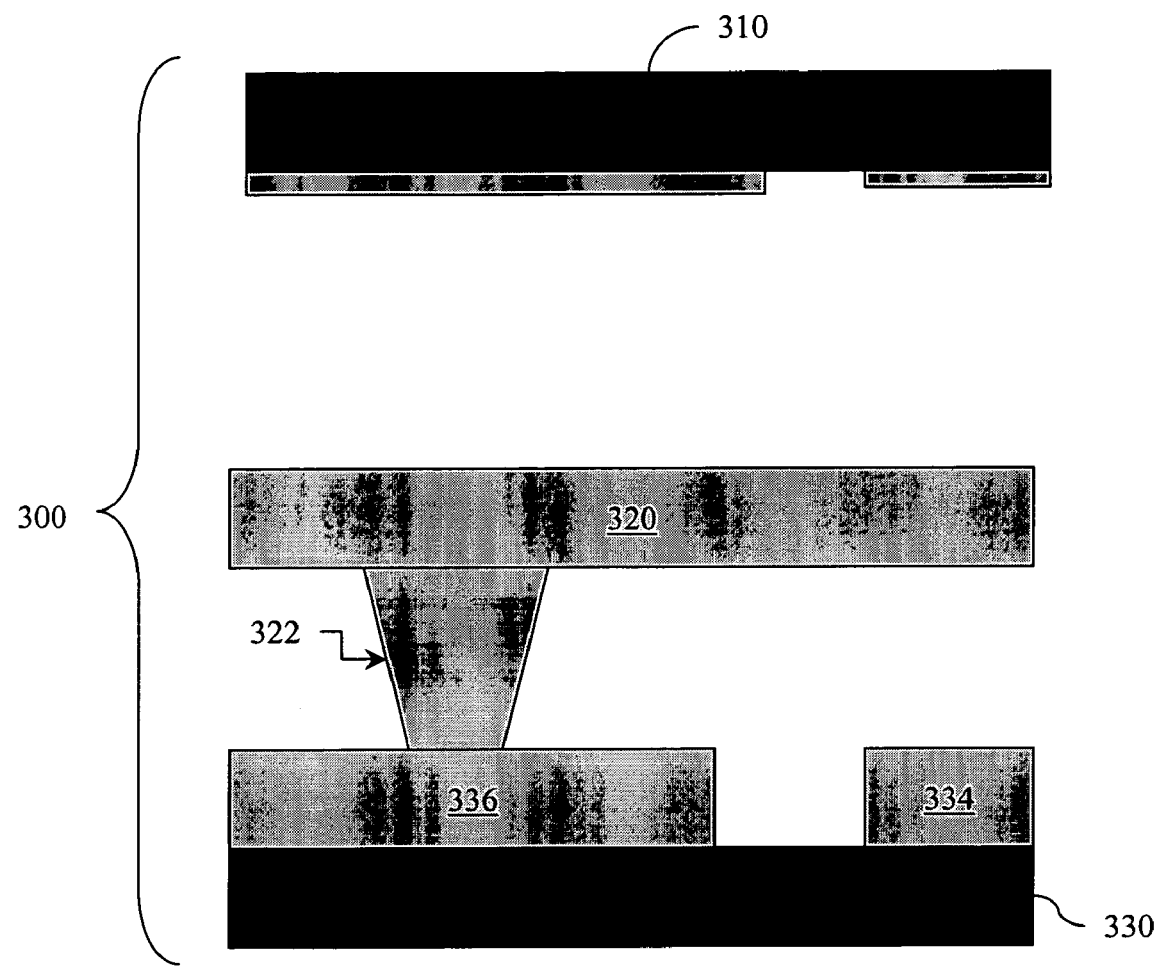
FIG. 11 illustrates an example FPID.

FIG. 11 illustrates another example of FPID 300 with some of its circuitry removed. In this example, there is only one stop, stop 322. While a single stop 322 is illustrated, it is to be appreciated that in different examples reflector 320 may be configured with more than one stop 322. For example, configuring reflector 320 with multiple (e.g., eight) stops 322 may facilitate improving operating characteristics like stability when portions associated with bottom substrate 330 contact the stops 322. Reflector 320 is illustrated in a down-stop position.

Thus, FIGS. 10 and 11 are intended to illustrate that in different examples MEMS FPIDs may have different collections of different types and numbers of stops configured onto different plates.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A micro-electro-mechanical systems (MEMS) electromagnetic wave modulator, comprising:
   a first reflector;
   a second reflector positioned and oriented with respect to the first reflector to define a Fabry-Perot (FP) cavity between the first reflector and the second reflector, the second reflector being moveable by an electrostatic force;
   the first reflector including one or more stops to prevent contact between the first reflector and the second reflector, where the one or more stops are fabricated substantially from a conductive material; and
   a circuit configured to maintain at least a portion of the first reflector, the second reflector, and the one or more stops at an electrical potential that will yield a zero electric field contact event to facilitate preventing stiction.

2. The MEMS electromagnetic wave modulator of claim 1, where the one or more stops are surrounded by one or more trenches to electrically isolate the one or more stops from at least a portion of the first reflector.

3. The MEMS electromagnetic wave modulator of claim 1, the first reflector, the second reflector, and a capacitor plate being arranged in a dual gap configuration.

4. The MEMS electromagnetic wave modulator of claim 2, comprising:
   a capacitor plate positioned below the second reflector and outside the FP cavity;
   one or more second stops on the second reflector to facilitate maintaining an FP cavity gap size and preventing contact between the second reflector and the capacitor plate, where the first reflector, the second reflector, and the capacitor plate are arranged in a dual capacitor configuration;

one or more second trenches to electrically isolate portions of the capacitor plate that contact the one or more second stops, where the one or more trenches in the first reflector and the one or more second trenches facilitate reducing charge trapping at the one or more stops in the first reflector and the one or more second stops;

where the circuit maintains the second reflector, the one or more first stops, and the portions of the capacitor plate that contact the one or more second stops at an equal electrical potential.

5. The MEMS electromagnetic wave modulator of claim 1, the FP cavity being controllably selective of a selected wavelength of an electromagnetic wave and a selected intensity of the electromagnetic wave.

6. The MEMS electromagnetic wave modulator of claim 1, the first reflector being a top, semi-reflective mirror fabricated from a conductor.

7. The MEMS electromagnetic wave modulator of claim 6, the second reflector being a bottom, highly reflective mirror fabricated from a conductor.

8. The MEMS electromagnetic wave modulator of claim 7, the one or more stops being zero electric field, reduced stiction stops configured to facilitate controlling, at least in part, a gap size produced by the MEMS actuator.

9. A method, comprising:

for a pixel of a pixilated displayable image, controlling one or more of, a predetermined amount of charge over one or more Fabry-Perot (FP) cavities, and a predetermined voltage in one or more plates of an FP Interferometric Device (FPID) to select a visible wavelength at an intensity by optical interference to display the pixel, the FP cavity being defined between a top reflector and a pixel plate, one or more of the top reflector and the pixel plate including a stop fabricated from a conductive material;

the method including maintaining the top reflector, the pixel plate, and the one or more stops at an electrical potential so that contact between one or more of the top reflector, the pixel plate, and the one or more stops will be a zero electric field contact event.

10. The method of claim 9, including providing light for illuminating the visible wavelength.

11. The method of claim 10, including dividing a displayable image into the pixilated displayable image.

12. The method of claim 11, where controlling the predetermined amount of charge over one or more FP cavities comprises:

for a red color wavelength, controlling the predetermined amount of charge over a first FP cavity to select a red intensity corresponding to a red color component for the pixel;

for a green color wavelength, controlling the predetermined amount of charge over a second FP cavity to select a green intensity corresponding to a green color component for the pixel;

for a blue color wavelength, controlling the predetermined amount of charge over a third FP cavity to select a blue intensity corresponding to a blue color component for the pixel; and for a black state, controlling the predetermined amount of charge over a fourth FP cavity to select a black color component for the pixel.

13. The method of claim 12, including selectively controlling the size of at least one FP cavity by controlling a voltage applied to the pixel plate.

14. The method of claim 13, including maintaining a pixel plate stop and an outer bottom capacitor plate ring at an electrical potential so that contact between the pixel plate stop and the outer bottom capacitor plate ring will be a zero electric field event.

15. A system, comprising:

a tunable micro-electro-mechanical system (MEMS) Fabry-Perot interferometric device (FPID) configured to transmit an electromagnetic wave having a desired wavelength and a desired intensity;

means for supplying a selected voltage to one or more plates in the tunable MEMS FPID to facilitate tuning the MEMS FPID; and means for maintaining the one or more plates and one or more stops in the MEMS FPID at electrical potentials such that contact between the one or more stops and the one or more plates will be zero electric field events.

16. The system of claim 15, the MEMS FPID being arranged in a dual capacitor configuration, and including a first reflector and a second reflector positioned and oriented with respect to the first reflector to define a Fabry-Perot (FP) cavity between the first reflector and the second reflector; and the first reflector including a stop formed of a conductive material, the first reflector also including a trench that electrically isolates the stop on the first reflector from at least one other portion of the first reflector.

17. The system of claim 15, where the one or more plates in the tunable MEMS FPID include the one or more stops fabricated from a conductive material.

18. The system of claim 15, where the one or more plates in the tunable MEMS FPID include one or more trenches configured to electrically isolate the one or more stops from at least one other portion of the one or more plates.

* * * * *